March 31, 1959 R. R. SAMPSELL 2,879,909
BOAT TRAILER AND FRAME CONSTRUCTION
Filed May 22, 1956
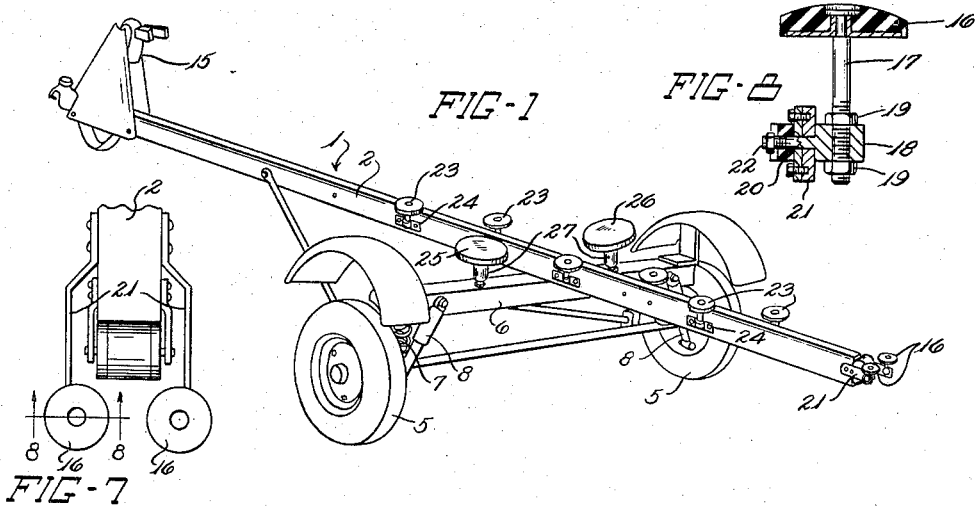
INVENTOR.
RALPH R. SAMPSELL
BY Oldham & Oldham
ATTYS.

United States Patent Office 2,879,909
                                      Patented Mar. 31, 1959

2,879,909
BOAT TRAILER AND FRAME CONSTRUCTION

Ralph R. Sampsell, Youngstown, Ohio; Virginia Sampsell, executrix of the estate of said Ralph R. Sampsell, deceased, assignor to Virginia R. Sampsell and Dollar Savings & Trust Company, Youngstown, Ohio, a corporation of Ohio, trustees Application May 22, 1956, Serial No. 586,543

4 Claims. (Cl. 214—506)

This invention relates to boat trailers and frames therefor, and especially relates to an improved type of a boat trailer frame of the type disclosed in and covered by my United States Letters Patent No. 2,691,534.

Boat trailers of the type referred to in my above patent are made with a longitudinally extending center frame unit that extends generally about the length of the trailer and which has suitable running gear including springs, support arms, wheels and the like secured thereto and extending transversely therefrom for properly supporting a boat on the trailer for transporting the boat thereon. In my prior patent, one particular feature of the invention resides in the use of a tubular center frame member which is provided with a pair of opposed, spaced parallel support shoulders on vertical upper margins of the center frame member. This center frame member has a groove extending longitudinally thereof, which groove is adapted to receive a boat keel therein at any portion of the longitudinal length of the boat trailer to facilitate longitudinal sliding loading or unloading movement of the boat on the trailer.

The general object of the present invention is to provide an improved boat trailer of the type referred to and wherein roller means are provided for facilitating longitudinal movement of a boat on the trailer.

Another object of the invention is to provide an inexpensive but sturdy positioning means on a boat trailer for supporting rollers on the boat trailer frame.

Another object of the invention is to provide recesses or slots in the upper portion of a longitudinal frame member in a boat trailer which recesses or slots are defined by dependent ears or flanges used for journaling a roller support spindle in the boat trailer at longitudinally spaced portions thereof.

A further object of the invention is to provide a pair of laterally spaced rollers at the loading end of a trailer to aid in centering a boat as it is loaded onto the trailer.

The foregoing and other objects and advantages of the invention will be made more apparent as the application proceeds.

In order to understand the present invention more completely, reference is directed to the accompanying drawings wherein:

Fig. 1 is a perspective view of a trailer embodying the principles of the invention;

Fig. 2 is an enlarged plan view of a section of the longitudinal frame member of the boat trailer of Fig. 1;

Fig. 3 is a side elevation of the boat trailer frame of Fig. 2;

Fig. 4 is a vertical section taken on line 4—4 of Fig. 3;

Fig. 5 is a fragmentary vertical section taken on line 5—5 of Fig. 2;

Fig. 6 is a vertical section like Fig. 5 only with the roller member removed from the frame member; and Fig. 7 is a fragmentary plan of the loading end of the trailer of Fig. 1; and Fig. 8 is an enlarged section of the end loading rolls of the trailer.

When referring to corresponding parts shown in the accompanying drawings and referred to in the specification, corresponding numerals are used to facilitate comparison between such equivalent or corresponding parts.

The present boat trailer of this invention includes a tubular center support frame extending longitudinally of the boat trailer and which center frame has support shoulders provided on the upper vertical margins of such center frame; the center frame has longitudinally spaced apertures in its upper surface formed by pairs of opposed, downwardly extending, integral ears struck from the tubular center frame; roller means are positioned on said ears and extend upwardly of the center frame for support action thereon; a pair of laterally spaced guide rollers are secured to the center frame at the loading end thereof; and transversely directed support and wheel means are associated with the center frame member to complete the trailer and aid in boat support action thereon. Other features of the invention are described hereinafter.

In order to understand the present invention more completely, the details of the invention will now be fully described and the boat trailer of the invention is indicated in the drawings as a whole by the numeral 1. This boat trailer 1 has a tubular, hollow center frame member or beam 2 that extends the length of the boat trailer 1. Usually this center frame 2 is made from a metal tube which has been rolled or otherwise formed to the desired shape. The center frame is substantially square in vertical section and a pair of parallel, spaced support shoulders 3 and 4 are provided on the vertical upper lateral margins of the center frame 2, as best indicated in Fig. 4 of the drawings. The boat trailer 1 includes conventional members, such as wheels 5, that are connected to a transversely extending frame member 6 by suitable spring means 7 and shock absorbers 8.

An important element of the present invention resides in the provision of a number of longitudinally spaced boat support or engaging rollers 9 in the boat trailer 1. These rollers 9 are journalled in any known manner, as by bearings, upon support spindles or shafts 10. The novel feature of the positioning of the rollers 9 in the boat trailer 1 relates to the provision of a pair of opposed, integrally formed, downwardly extending ears or lugs 11 and 12 from the upper surface of the center frame 2. The lugs 11 and 12 form a plurality of slots 13 at desired longitudinally spaced locations on the upper surface of the center frame 2. Prior to actually punching the slots 13 in the center frame 2 by downward movement of the ears 11 and 12, preferably a slotted opening 14 is provided in each one of the ears 11 and a hole 14a is formed in each lug 12 for a purpose to be hereinafter described. These ears or lugs 11 and 12 are then severed from the center frame 2 and are forced downwardly into the hollow center portion of the center frame 2. The lug 11 may be initially positioned as indicated in dotted lines in Fig. 4.

To assemble the rollers 9, they are placed on the shafts 10 and inserted into the slots 13. One end of each shaft 10 is round to be received in the hole 14a in the lug 12, while the other end of each shaft is provided with a pair of parallel flat surfaces 10a to fit the slots 13. These flat surfaces 10a may serve to hold the rollers 9 on the shafts 10. The shaft 10 is downwardly inclined and the round end is placed in the hole 14a. The shafts 10 are moved axially to seat the flat surfaces 10a in the slots 14. A suitable tool (not shown) may then be inserted through the slots 13 to engage the lower or inner ends of the ears 11 so that they can be pulled laterally inwardly of the center frame 2 to secure the end of the shaft 10 for journalling such rollers 9 in the center frame.

It will be noted that these slotted openings 14 are of irregular, or non-circular shape and Fig. 5 of the drawings indicates that the flattened surfaces 10a are of a shape complementary to the slotted openings 14, but smaller than such openings for ready insertion therein. The shafts 9 will be easily retained in engagement with the ears 11 and 12 by moving one ear laterally inwardly slightly in the center frame 2. It will be noted that the rollers 9 extend vertically above the adjacent surfaces of the center portion of the center frame 2 for ready engagement with the keel or other portion of a boat resting on the grooved center portion of the center frame 2. These rollers 9 greatly facilitate loading a boat on or unloading a boat from the trailer 1.

The boat trailer 1 is provided with any conventional members indicated at 15 for use in reeling or cranking a boat up onto the trailer 1 to seat properly thereon. This mechanism 15 has a suitable cable or other line associated therewith for engaging the boat to draw it up on trailer in accordance with conventional procedures.

The loading of a boat onto the trailer 1 is also greatly faciliated by the provision of a pair of resilient loading rolls or discs 16 at the loading end of the center frame 2. Each of the rolls 16 is journalled on a vertically extending rod 17 supported on a block 18 by threaded connection therebetween. The position of the rod 17 is vertically adjustable on the block 18 and it is locked in a given position by nuts 19. A torsion bushing 20 is used to secure the individual blocks 18 to individual support arms 21 by a bolt 22 or equivalent member. The support arms 21 are fixed to and carried by the center frame 2 by any conventional means so that they protrude to the rear from such center frame. Hence, the rods 17 and rolls or discs 16 can oscillate in a direction of from front to rear of the trailer when load is applied to the rolls 16.

It will be seen that the cooperation of the laterally spaced loading rolls 16 and the rolls 9 provides very easy loading action for a boat onto the trailer. Such action also is facilitated by the shoulders 3 and 4 that engage the keel of a boat to maintain it centered after once properly started by the rolls 16. The tops of the rolls 16 preferably are of flat conical shape as that is believed to aid the centering action for a boat initially engaging one of the rolls. The tops of the rolls 16 should be about on a level with the upper surface of the shoulders 3 and 4 for best loading action.

The rolls 16 and their supports may be used as an attachment to be secured to any trailer, if desired. Also, the rolls may be directly carried by said center frame when convenient.

Fig. 1 of the drawings shows that other centering and guide rolls 23 can be secured to the center frame 2 at longitudinally spaced portions thereof. These rolls 23 are generally the same as the rolls 16 and can be secured to the center frame by brackets 24 in place of the extension arms 21. The rolls are journalled on rods 24a which may be vertically adjustable on the brackets 24.

Another important feature of the trailer 1 relates to a pair of boat support rolls 25 and 26 journalled on support rods 27. These support rods 27 may be in vertically adjustable engagement with the frame member 6 or means thereon. A conventional means (not shown) such as lock nuts or the like can secure the support rods 27 or the rods 24a in a desired position. The rolls 25 and 26 preferably tilt inwardly slightly to provide additional contact with a boat supported thereon.

By using a plurality of the support and guide rolls 23 on the trailer frame, such rolls 23 also aid in centering a boat on the trailer 1. Hence, in some instances, the shoulders 3 and 4 might not be required on the frame when the rolls 23 are used. The combination of the shoulders 3 and 4 and rolls 23 facilitates boat loading and unloading action with a minimum of scratching or damage to the boat even though frequently placed on the trailer. Particularly desirable action results in all events by use of the rollers 9 which may combine with rolls 23 to maintain a boat centered on the trailer frame for loading and unloading action.

It is believed that the objects of the invention have been achieved by the provision of a novel type of a boat trailer which has special desirable properties in the convenience of moving a boat longitudinally over the trailer 1 when engaged therewith at any portion of the longitudinal length of the center frame 2. The boat trailer is inexpensive to manufacture, but of sturdy construction and will give a long service life.

While one complete embodiment of the invention has been disclosed herein, it will be appreciated that modification of this particular embodiment of the invention may be resorted to without departing from the scope of the invention as defined in the appended claims.

I claim:

1. In a boat trailer, a tubular metal frame extending the length of the trailer, said frame being a unitary construction of substantially square shape in section and having a longitudinally extending groove in its upper surface intermediate a pair of flanges on the upper edges of said frame, said tubular frame having a series of longitudinally spaced holes in the upper surface thereof provided by pairs of downwardly extending metal ears at each hole which ears are integral with said frame, said ears being adjacent the lateral margins of said tubular frame and each having an aperture therein, roller spindles received in said apertures and extending across said holes, rollers carried by said spindles and extending vertically upwardly above the grooved portion of said tubular frame for support action, and wheel and support means secured to said tubular frame.

2. In a boat trailer, a hollow center frame with support shoulders extending longitudinally thereof, said frame having an aperture in its upper surface intermediate said support shoulders and formed by downwardly extending integral ears, roller means positioned on said ears and protruding upwardly of said center frame above the upper surface of said frame intermediate said shoulders, a pair of extension arms secured to said center frame and extending to the rear therefrom, a pair of support rods, torsion bushings individually securing each of said support rods to said extension arms, and a flat topped roll journalled on each of said support rods at the rear of and at a lateral position with relation to said center frame to aid in loading boats thereon.

3. In a boat trailer, a tubular frame extending the length of the trailer, said frame being of substantially square shape in section and having a longitudinally extending boat support surface thereon, said tubular frame having a series of longitudinally spaced holes in the upper surface thereof provided by pairs of downwardly extending ears at each hole, said ears being adjacent the lateral margins of said tubular frame and one ear of each pair having a round aperture therein and the other ear of each pair having a slotted aperture therein, roller spindles received in said apertures and extending across said frame below said holes, said spindles each having a round end received in said round aperture and a flattened end nonrotatably received in said slotted aperture, rollers carried by said spindles and extending vertically upwardly above the support surface of said tubular frame for support action, and wheel and support means secured to said tubular frame.

4. In a boat trailer, a tubular metal frame extending the length of the trailer, said frame being a unitary construction and of substantially square shape in section and having a longitudinally extending groove in its upper surface intermediate a pair of flanges on the upper edges of said frame, said tubular frame having a series of longitudinally spaced holes in the upper surface thereof provided by pairs of downwardly extending metal ears at each hole, said ears being integral with said frame and with each one of said ears being at a lateral margin of a said hole and adjacent a lateral margin of said tubular frame, transversely extending spindles operatively carried by and extending between said ears below the grooved surface of said metal frame, rollers carried by said spindles and having portions extending up above the grooved portion of said tubular frame for boat support action, and wheel and support means secured to said tubular frame.

References Cited in the file of this patent

UNITED STATES PATENTS

| | | |
|---|---|---|
| 1,660,512 | Jaenicke | Feb. 28, 1928 |
| 2,109,923 | Lemmon | Mar. 1, 1938 |
| 2,261,088 | Kendall | Oct. 28, 1941 |
| 2,460,596 | Roche | Feb. 1, 1949 |
| 2,497,072 | Cooper | Feb. 14, 1950 |
| 2,667,978 | Pridy | Feb. 2, 1954 |
| 2,691,534 | Sampsell | Oct. 12, 1954 |
| 2,708,045 | Shontz | May 10, 1955 |
| 2,733,823 | Evans | Feb. 7, 1956 |
| 2,746,622 | Roy | May 22, 1956 |
| 2,766,897 | Alker | Oct. 16, 1956 |